Patented Aug. 4, 1931

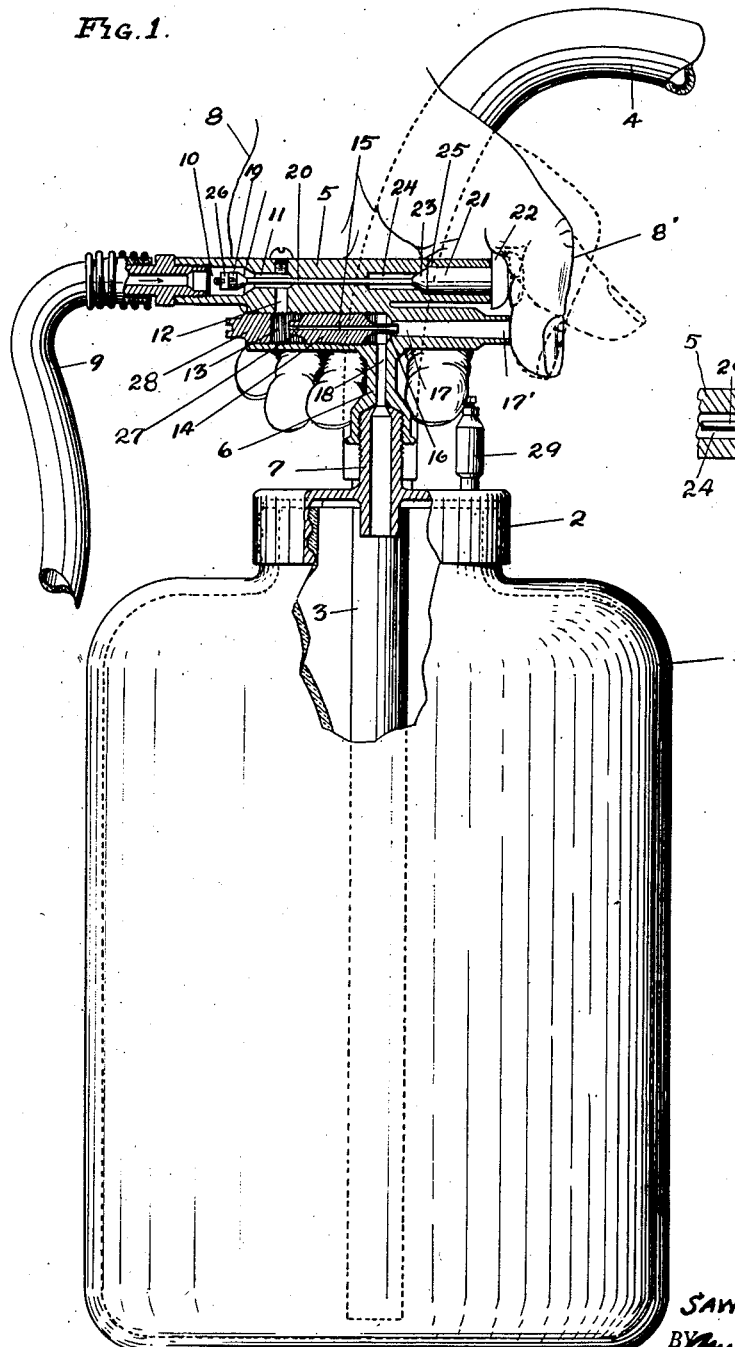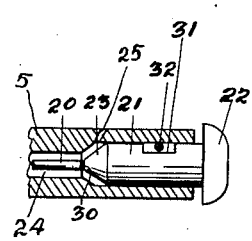

1,817,016

UNITED STATES PATENT OFFICE

SAWYER Y. MONCKTON, OF SAN FRANCISCO, CALIFORNIA

ASPIRATOR DEVICE FOR FLUSHER CONTROL

Application filed December 24, 1928. Serial No. 328,267.

This invention relates to a combination valve arrangement on an aspirator for controlling the operation of a flushing device as used in the cleaning of automobile gear and crank cases and the like for withdrawing and injecting oil and grease thereinto.

The objects of the invention are to provide improved construction in a combination fluid operated aspirator head whereby a better exhaustion of a pipe or tank may be obtained, or a pressure developed therein, also which is easier to operate, rugged in construction, and simple to manufacture.

In the drawings accompanying this application I show my improved aspirator head construction mounted on a small tank or receptacle into which it is desired to draw out the spent oil from a crank case, or from which receptacle it is desired to eject clean oil into the case, or alternately inject and withdraw the oil for flushing purposes. In the present invention the novelty lies in the construction of the aspirator head combination.

In the drawings accompanying this application Fig. 1 is a side elevation of my apparatus as arranged complete with a receptacle, air pressure hose, and working hose or pipe, and with the aspirator head shown in section.

Fig. 2 is an enlarged section of a portion of the aspirator head showing a modified construction of the finger piece for operating the air valve.

Briefly described my device comprises an aspirator adapted for securing to a pipe or to a receptacle, and valved in such a manner that the interior of the receptacle may be subjected either to exhaustion or to a pressure, by simple movement of the finger of the operator's hand holding the device.

In the drawing 1 is a receptacle closed by a cap 2 upon which my aspirator is mounted. Also extending through the cap to the interior of the receptacle 1 is a working pipe 3 which is extended outside of the receptacle in the form of a flexible hose 4 adapted for insertion into a gear or crank case for withdrawing or injecting oil or other fluid thereinto.

The aspirator proper comprises a body portion 5 extending horizontally and having a vertical branch 6 extending downward for securing to the receptacle, preferably by threading the branch extension of the aspirator to a boss 7 projecting upwardly from the cap 2 as indicated. The horizontally extending body portion 5 of the aspirator is adapted for holding in the hand 8 of an operator for carrying about, and for manipulating the valve or valves of the same, while at one end of the body is attached an air pressure hose 9, such for instance as the air pressure hose used for inflating tires in a service station, and which air pressure hose furnishes the fluid under pressure for operating the device.

The body is ported and valved variously as follows. Air upon entering from the pipe 9 is received into a chamber 10 which communicates through a reduced passage 11 to a transverse or downwardly extending passage 12 to a chamber 13 in which is a nipple 14 provided with a small central passage 15 preferably flared slightly at its outer end, and which nipple terminates in an elongated nozzle 16 extending slightly beyond the forward shoulder of the passage 13 into a reduced exhaust passage 17 which passage may flare outwardly slightly as shown to the point of exhaustion at 17', and where it is adapted to be closed by the pressure of a finger thereover as indicated. From the forward portion of chamber 13 is a downwardly extending passage 18 which communicates with the interior of the receptacle 1 for exhausting the same, or for introducing a fluid under pressure thereto as may be desired.

Within chamber 10 is a valve 19 adapted to seat against a complementarily formed portion of the chamber in a manner to close off the passage 11. The valve 19 is preferably of soft metal or faced with soft metal in the common manner to make such valves tight, and preferably threaded upon a rod 20 extending freely through a bore and provided at its other end with an enlarged cylindrical piece 21 freely slidable in an enlargement of the passageway and provided with a cap or finger-piece 22 on its outer end adapted for pressing by the finger of the operator's hand so as to forcibly slide the rod 20 and thus open the valve 19 as indicated in the drawing figure. Cylindrical piece 21 is formed into a conical valve 23 at its inner end adapted to seat in a corresponding portion of the passageway and the passageway is enlarged at 24 appreciably beyond the diameter of the rod 20 so that absolute alignment of the parts will not be necessary in order to make the valve 23 seat properly when pressed inward to the point shown in the figure. The same freedom of operation is provided for the valve 19 by the enlarged bore 11 through which the rod 20 passes.

Immediately adjacent the inner termination of the cylindrical portion 21 when the valve 23 is seated, is a small vent aperture 25 provided for a purpose which will be later described.

It is contemplated that the valve 19 be removable from the end of the body to which the air hose is attached, so that it may be renewed or adjusted, and to this end it is preferably screwed to the rod 20 as mentioned and locked by a nut 26, or in any other desired manner is prevented from working loose.

The aspirator nipple 14 is reduced at its inner end as at 27 and made polygonal on its exterior so as to afford means of turning the same by means of a wrench for adjusting the nipple longitudinally in its threaded chamber 13. The rearward end of the chamber 13 is tightly closed by a screw plug 28.

In operation of this device with air under pressure of say one or two hundred pounds entering the chamber 10 from the hose 9, and with the finger of the operator released from the finger-piece 22, the result would be to at once close the valve 19 so that no further effect would be produced. When desiring to exhaust the receptacle 1 a pressure upon the finger-piece 22 will at once open the valve 19 and simultaneously close the valve 23 so that the air under pressure will find its way down to the chamber 13 and will pass with great speed through the aspirator nozzle 14 to siphon off the fluid contents of the receptacle 1 in the well known manner.

I have found that by flaring the exhaust passage 17 to a larger diameter at the outer end as at 17', and also by projecting the reduced end of the aspirator nozzle to a point substantially within the passage 17, instead of terminating it substantially before said passage in the usual manner as well as by slightly flaring the same, that I secure a much greater efficiency in the exhausting of the vessel. In fact with an air pressure of 120 pounds per square inch entering the aspirator from hose 9 and a one-gallon receptacle in position I am enabled in practice to obtain a vacuum as high as 27 to 28 inches in the course of two or three seconds of time with a nozzle aperture of about .067 of an inch in diameter and about 1¼ inches long, thus being extremely economical in the use of air, whereas with the prior construction in which the aspirator nozzle did not extend into the passage 17 no result approximating this was possible.

When pressing inwardly on finger button 22 it is evident the valve 19 opens at once thus permitting the air pressure to pass through the bore in which the rod 20 is loosely slidable, and thereby build up a pressure against the inner end of cylindrical piece 21, which would ordinarily cause too great a resistance for operation with the finger as shown, on account of the relatively large diameter of the cylindrical piece 21. However, as it is desirable to have this cylindrical piece 21 fairly large in order to make a substantial device which is not easily injured in case it should fall or be struck by anything, I overcome the difficulty by provision of the small leak hole at 25, as this permits escape of any pressure which may accumulate at the instant before the seating of the valve 23, for after seating of this valve the effective area against the piece 21 is greatly reduced so that it requires no effort to hold the valve in position shown in the drawing.

When using the device to exhaust the receptacle 1 the thumb must be raised from a position closing the exhaust end 17' of the device, while keeping the finger button 22 depressed with the first joint of the thumb as shown.

When, however, the end of the thumb is dropped over the exhaust opening 17' in the manner indicated in the drawing the air pressure entering from the hose 9 will find its way through the passages described directly into the container 1 so as to build up any desired pressure therein, or to a point as might be limited by a safety valve as provided at 29.

By the arrangement described it will be seen that with the simple movement of one finger of the hand, as the thumb 8', from the full line to the dotted line position, it is possible to uncover the exhaust port 17' as well as permit free outward movement of finger-piece 22 so that the air valve 19 will be closed thus rendering the device inactive, or by partially lowering the thumb the finger-piece 22 may be operated while still preserving a free discharge to the exhaust 17', and that by a still further movement of the thumb both the exhaust may be closed as well as the button 22 depressed, thus almost instantly changing the action from an exhausting aspirator to an air pressure injecting device, so far as the receptacle 1 is concerned. It is also evident that this apparatus may be applied directly to a pipe instead of the receptacle 1 if desired.

While I show the valve construction in which a rod 20 carries at one end the air valve 19 and at the other end the finger-piece 21 all integrally connected, I may modify this construction as shown in Fig. 2 wherein the rod 20 terminates at 30 so as to bear freely against the conical end of the device 21, and the device 21 is prevented from falling out of the passage in which it works through the provision of a flat spot 31 on its side and adjacent which passes a stop pin 32 extending through the metal of the body. It is of course evident that instead of the flat spot 31 a reduced neck could be run around the cylindrical portion 21 with the same result. By the modification shown it is somewhat easier to insert and remove the parts, as the valve 19 and its rod may be removed by taking off the air hose and letting them slide out of the open end of the body at the air inlet side.

In contemplation of my invention as above described, it will be evident to any mechanic that minor changes may be made in the arrangement of ports and valves without affecting the principle of operation, and any such as may fall within the spirit of the invention are intended to be covered by the scope of the appended claims.

I claim:

1. An aspirator device comprising a substantially T-shaped body, means for connecting a fluid pressure supply pipe at one end of the T arm, a valve for controlling admission of fluid from said pipe to the body, aspirator passages within the body including an exhaust at the opposite end of said T arm, and finger operated means for operating said valve located above said exhaust in a manner whereby said valve may be operated and said exhaust may be closed and opened by the thumb of a hand holding said device.

2. An aspirator device comprising a substantially T-shaped body, means for connecting a fluid pressure supply pipe at one end of the T arm, an automatically closed valve for controlling admission of fluid from said pipe to the body, aspirator passages within the body including an exhaust at the opposite end of said T arm, and finger operated means for operating said valve located adjacent said exhaust comprising a member projecting from the end of the T arm slidably mounted in a bore therein and arranged to open said valve against the fluid pressure upon being slid inwardly.

3. In a structure as specified in claim 2, said member being relatively large and actuating a relatively small extension to the valve.

4. In an aspirator device of the character described, a body, a fluid pressure inlet thereto, a valve closing the inlet in direction of pressure, a rod extending slidably in the body, and a finger operated member projecting from the opposite end of the body comprising a cylindrical piece larger than said rod slidably mounted in a bore and provided with a valve closure inner end arranged to actuate said rod and also to seal said bore upon being slid inwardly.

5. In a structure as specified in claim 4, a pressure vent in said bore just outward of the valve closure inner end of said cylindrical piece.

6. An aspirator device comprising a body ported to receive fluid under pressure for aspirating the contents of a receptacle communicating therewith, the ports in the body including an exhaust passage, a suction passage opening to the exhaust passage, an aspirator nozzle projecting beyond said suction passage within said exhaust passage, said exhaust passage flared larger at the discharge end, and said nozzle threadedly mounted for longitudinal adjustment into said exhaust passage.

7. In an aspirator device, a T-shaped body, substantially parallel passages through the T arm, a suction passage connecting one of said passages extending through the leg of the T, a cross passage connecting the parallel passages, an aspirator nozzle in the parallel passage connected by said suction passage positioned between the same and said cross passage, and a fluid pressure admission valve on the other parallel passage.

8. In an aspirator device, a T-shaped body, substantially parallel passages through the T arm, a suction passage connecting one of said passages extending through the leg of the T, a cross passage connecting the parallel passages, an aspirator nozzle in the parallel passage connected by said suction passage positioned between the same and said cross passage, a fluid pressure admission valve on the other parallel passage, and finger operated means at the end of the latter passage for actuating said valve.

SAWYER Y. MONCKTON.